United States Patent [19]
Liu

[11] Patent Number: 5,397,960
[45] Date of Patent: Mar. 14, 1995

[54] NEON LAMP WITH SOUND-INTENSITY CONTROL

[76] Inventor: Sheng-Yu Liu, No. 19, Alley 3, Lane 157, Si-Shyn Rd., Feng Yuan City, Taichung Hsien,

[21] Appl. No.: 181,431

[22] Filed: Jan. 14, 1994

[51] Int. Cl.⁶ .............................................. H01K 7/00
[52] U.S. Cl. ................................. 315/76; 340/825.25; 340/815.73; 340/815.75; 313/49; 313/110
[58] Field of Search ...................... 315/76; 340/815.17, 340/825.25, 815.15; 313/49, 110

[56] References Cited

U.S. PATENT DOCUMENTS 4,353,008 10/1982 Dorfman .............................. 315/76

Primary Examiner—Robert J. Pascal
Assistant Examiner—Reginald A. Ratliff
Attorney, Agent, or Firm—Browdy and Neimark

[57] ABSTRACT

An inductive neon lamp set comprises a neon lamp and a circuit system comprising a speech detecting circuit for receiving a sound signal. The sound signal so received is amplified by a speech amplifying circuit of the circuit system which further comprises a power control circuit and a high voltage oscillating circuit. The neon lamp is caused to glow variably by various output signals delivered thereto from the high voltage oscillating circuit. The glowing variation of the neon lamp is dependent on the intensity of the sound signal received by the speech detecting signal.

6 Claims, 4 Drawing Sheets

NEON LAMP WITH SOUND-INTENSITY CONTROL

FIELD OF THE INVENTION

The present invention relates generally to a neon lamp, and more particularly to an inductive neon lamp set capable of detecting a speech intensity so as to regulate the variation of illumination range of the inductive neon lamp set.

BACKGROUND OF THE INVENTION

A neon lamp is generally used to illuminate lights of various colors, especially in advertising signs. The neon advertising signs can be made more attractive and interesting by means of a circuit control system, which is connected with the neon lamp so as to cause the neon lamp to glow intermittently. However, the conventional neon lamp provided with the circuit control system is by no means gratifying.

SUMMARY OF THE INVENTION

It is therefore the primary objective of the present invention to provide a neon lamp with an induction device capable of causing the neon lamp to have various illuminating ranges on the basis of the intensity of an external sound received by the induction device.

It is another objective of the present invention to provide an inductive neon lamp, which has an appropriate length and is capable of changing the length of the glowing portion of the inductive neon lamp on the basis of the intensity of an external sound received by the inductive neon lamp.

The foregoing objectives of the present invention are attained by the inductive neon lamp, which comprises mainly a neon lamp and a circuit system provided with a speech detecting circuit having an MIC (monolithic integrated circuit) for receiving an external sound. The circuit system is further provided with a speech amplifying circuit for increasing the strength of a signal received by the speech detecting circuit, a power control circuit for receiving a signal transmitted from the speech amplifying circuit, and a high voltage oscillating circuit disposed between the power control circuit and the neon lamp. The illuminating range of the neon lamp can be varied on the basis of the intensity of an external sound.

DETAILED DESCRIPTION OF THE INVENTION

Figure 1:
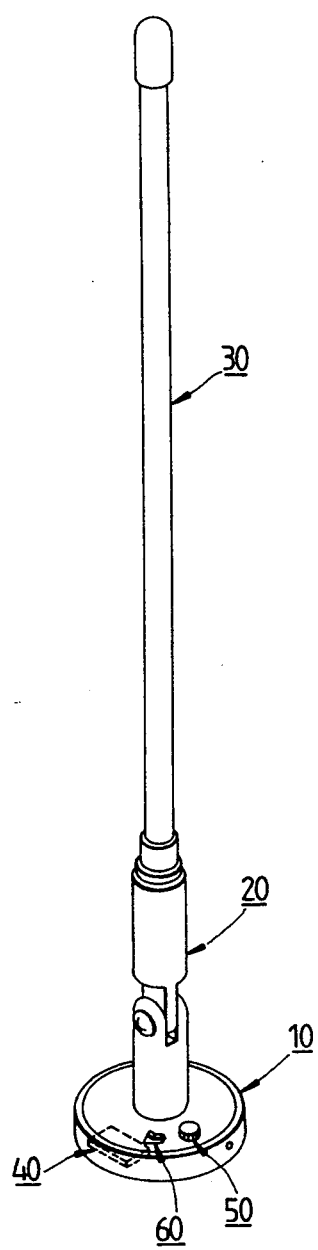
FIG. 1 shows a perspective view of a first preferred embodiment of the present invention.
Figure 2:
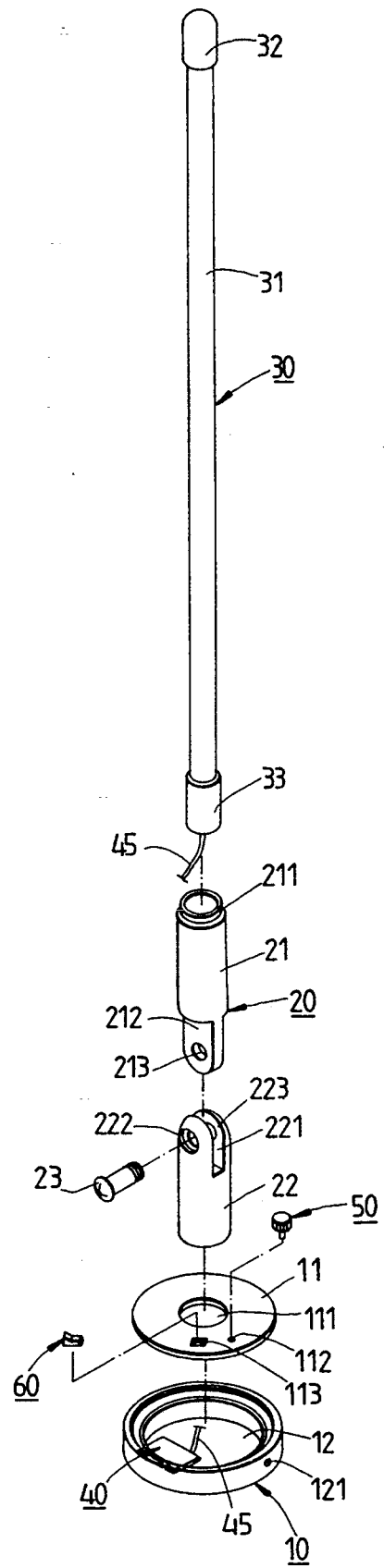
FIG. 2 shows an exploded view of the first preferred embodiment of the present invention.
Figure 3:
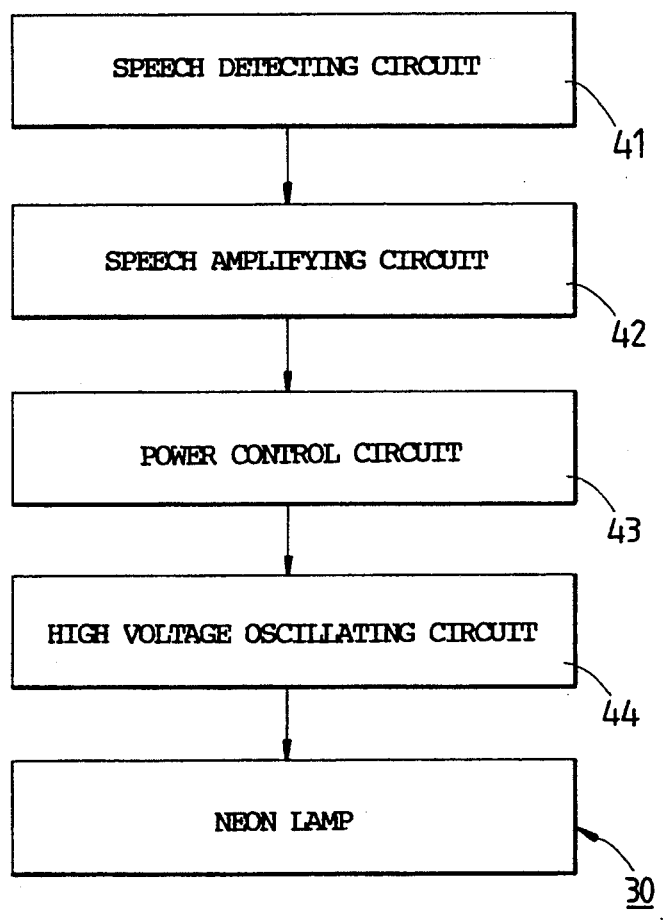
FIG. 3 shows a block diagram of the circuit system of the first preferred embodiment of the present invention.
Figure 4:
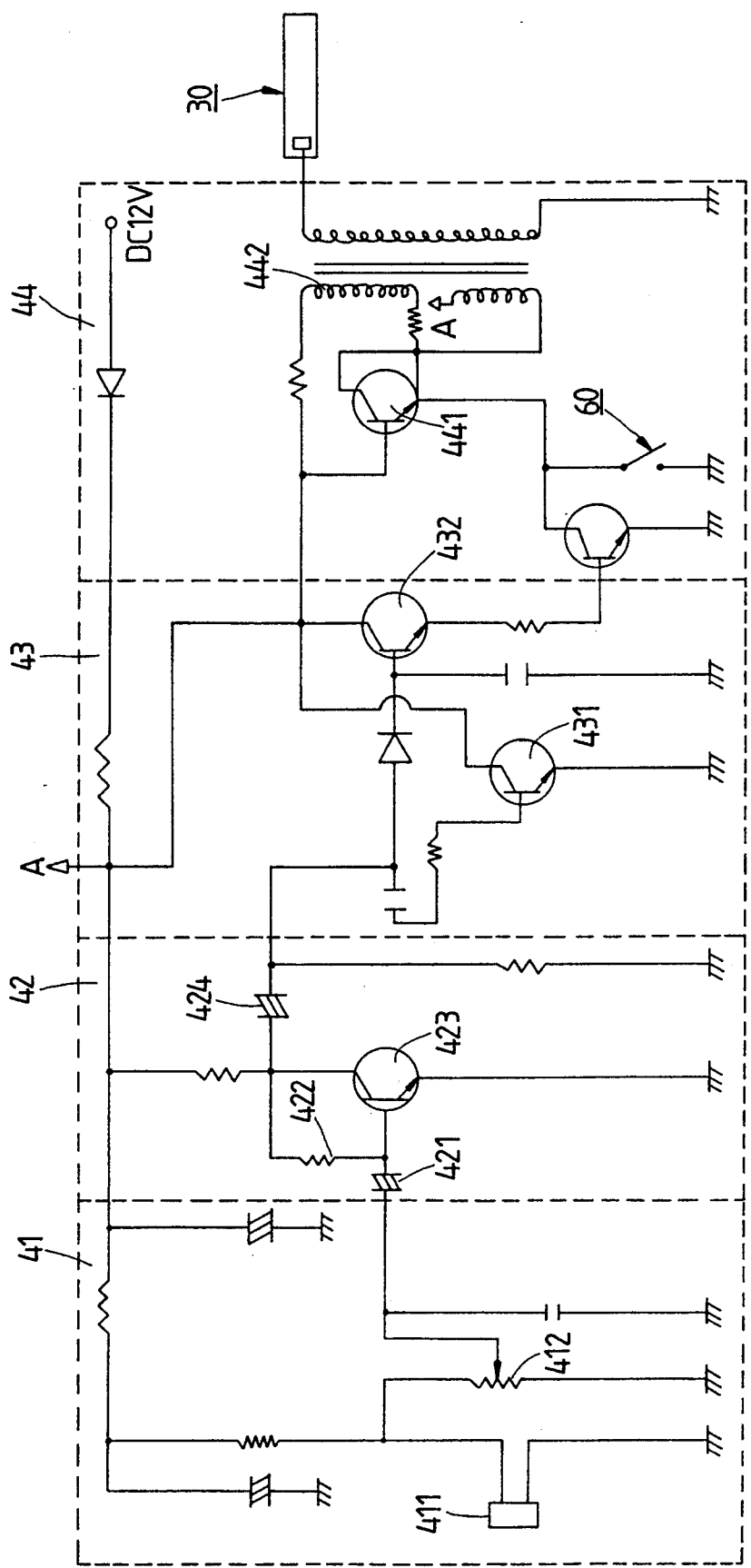
FIG. 4 shows a schematic view of the circuitry of the circuit system of the first preferred embodiment of the present invention.

As shown in FIGS. 1-4, an inductive neon lamp embodied in the present invention comprises a base 10, a connection rod 20, a neon lamp tube 30, a circuit system 40, an adjusting button 50, and a switch 60.

The base 10 is composed of a round cover plate 11 and a round cup body 12 dimensioned to receive the cover plate 11 which is provided centrally with an axial hole 111. The cover plate 11 is further provided with a first through hole 112 and a second through hole 113 while the cup body 12 is provided in the circumference thereof with a third through hole 121.

The connection rod 20 has an upper body 21 and a lower body 22. The upper body 21 is provided on the top thereof with a round tube 211 of an appropriate length and extending upwardly and axially. The round tube 211 has an outer diameter smaller than that of the upper body 21. The bottom end of the upper body 21 is provided with a pivoting lug 212 extending downwards and having a first pivoting hole 213. The lower body 22 has a bottom dimensioned to fit into the axial hole 111 of the cover plate 11 and a top portion provided with a slot 221 dimensioned to receive therein the pivoting lug 212. The top portion of the lower body 22 is further provided with a hole 222 and a threaded hole 223, which are opposite in location to each other for receiving a bolt 23 by means of which the upper body 21 and the lower body 22 are movably fastened.

The neon lamp 30 has a transparent columnar body 31 with a round cap 32 attached to the top end thereof. Fitted over the bottom end of the columnar body 31 is a sleeve 33 which has a bottom end dimensioned to fit into the round tube 211 of the upper body 21 of the connection rod 20.

The circuit system 40 is housed in the cup body 12 and connected with the neon lamp 30 by means of a guide wire 45. The circuit system 40 comprises a speech detecting circuit 41, a speech amplifying circuit 42, a power control circuit 43, and a high voltage oscillating circuit 44. The speech detecting circuit 41 has an MIC 411 for receiving an external sound and a variable resistance 412 connected with the MIC 411 for adjusting the sensitivity of the MIC 411. The adjusting button 50 is connected with the variable resistance 412 via the first through hole 112 of the cover plate 11. The speech amplifying circuit 42 is connected with the speech detecting circuit 41 and provided with a first capacitance 421, a bias resistance 422, a first transistor 423, and a second capacitance 424. The speech amplifying circuit 42 is intended for use in increasing the strength of a sound electric signal. The amplified electric signal of the sound is then delivered via the second capacitance 424 to the power control circuit 43 having a second transistor 431 and a third transistor 432 for controlling the strength of the output power. The high voltage oscillating circuit 44 receives the signal from the power control circuit 43 and has a fourth transistor 441 and an oscillation transformer 442. The length of an illuminating portion of the neon lamp 30 depends on the magnitude of the output power.

The switch 60 is received in the second through hole 113 of the cover plate 11 such that the switch 60 is connected with the fourth transistor 441 of the high voltage oscillating circuit 44.

The direct current power source is made available to the neon lamp 30 via the second through hole 121 of the cup body 12. When the switch is turned ON, the neon lamp 30 is caused to glow from the bottom thereof toward the top thereof. As the switch 60 is turned OFF, the MIC (monolithic integrated circuit) 411 of the speech detecting circuit 41 receives the signal of a sound such as a musical tone or a speech tone. The sound signal so received is then amplified by the speech amplifying circuit 42 before being transferred to the power control circuit 43 and the high voltage oscillating circuit 44. The output power is varied in accordance with the intensity of the sound received by the MIC 411. As a result, the length of the glowing portion of the neon lamp 30 is dependent on the sound intensity.

Figure 5:
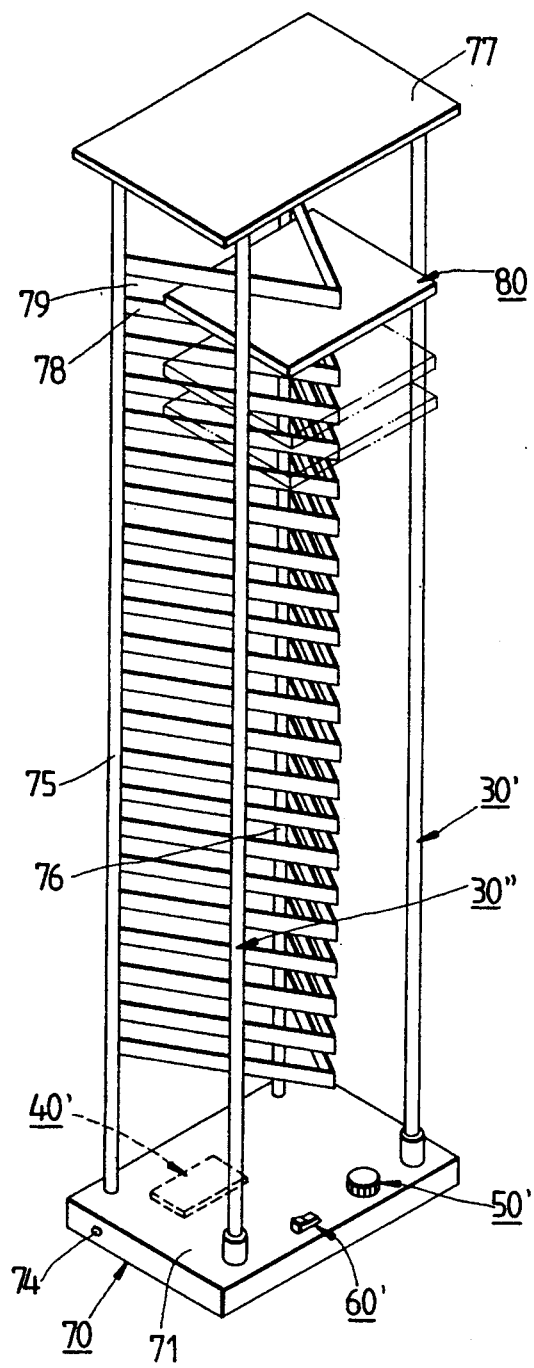
FIG. 5 shows a perspective view of a second preferred embodiment of the present invention.

The second preferred embodiment of the present invention is shown in FIG. 5, in which two neon lamps 30' and 30" are mounted in the front portion of a CD rack 70 which comprises a hollow base 71 provided thereon with an adjustment button 50' and a switch 60'. Located in a side wall of the base 71 is a hole 74 through which an electric wire (not shown) is put. A circuit system 40' is housed in the hollow base 71. Two support rods 75 and 76 are fastened uprightly to the rear portion of the base 71 such that the two support rods 75 and 76 support a top plate 77 in conjunction with the two neon lamps 30' and 30". Located between the hollow base 71 and the top plate 77 are a plurality of V-shaped plate bodies 78, which are arranged at an appropriate interval. The open space between the two V-shaped plate bodies 78 can be used to keep compact disks 80. The two neon lamps 30' and 30" are designed to glow variably in accordance with the rhythm of music.

What is claimed is:

1. An inductive neon lamp set comprising a neon lamp and a circuit system; wherein said circuit system comprises:
   a speech detecting circuit for receiving an external sound;
   a speech amplifying circuit for receiving and amplifying an output signal of said speech detecting circuit;
   a power control circuit for controlling the strength of an output signal of said speech amplifying circuit;
   a high voltage oscillating circuit for receiving an output signal of said power control circuit and for controlling the length of the glowing area of said neon lamp;
   a base having a hollow interior in which said circuit system is housed;
   a connection rod having one end that is fastened movably to said base; and
   a neon lamp of a rod-shaped construction and having an appropriate length and one end that is fastened with another end of said connection rod.

2. The inductive neon lamp set of claim 1, wherein said speech detecting circuit is provided with a variable resistance for adjusting a sensitivity of said speech detecting circuit at such time when said speech detecting circuit receives a sound signal.

3. The inductive neon lamp set of claim 1, wherein said high voltage oscillating circuit is connected with a switch so as to control a glowing pattern of said neon lamp in accordance with the intensity of said external sound.

4. An inductive neon lamp set comprising a neon lamp and a circuit system; wherein said circuit system comprises:
   a speech detecting circuit for receiving an external sound;
   a speech amplifying circuit for receiving and amplifying an output signal of said speech detecting circuit;
   a power control circuit for controlling the strength of an output signal of said speech amplifying circuit;
   a high voltage oscillating circuit for receiving an output signal of said power control circuit and for controlling the length of the glowing area of said neon lamp;
   a base having a hollow interior in which said circuit system is housed;
   at least a rod-shaped body fastened at the bottom end thereof with said base;
   at least one neon lamp of a rod-shaped construction and fastened at the bottom end thereof with said base;
   a top plate fastened to the top of said rod-shaped body; and
   a plurality of V-shaped plate bodies arranged at a predetermined interval between said base and said top plate.

5. The inductive neon lamp set of claim 4, wherein said speech detecting circuit is provided with a variable resistance for adjusting a sensitivity of said speech detecting circuit at such time when said speech detecting circuit receives a sound signal.

6. The inductive neon lamp set of claim 4, wherein said high voltage oscillating circuit is connected with a switch so as to control a glowing pattern of said neon lamp in accordance with the intensity of said external sound.

* * * * *